(12) United States Patent
De Paola et al.

(10) Patent No.: US 7,451,311 B2
(45) Date of Patent: Nov. 11, 2008

(54) METHOD AND SYSTEM FOR DECODING CHARGING DATA RECORDS IN MOBILE TELEPHONE NETWORKS

(75) Inventors: Maurizio De Paola, Turin (IT); Dario Parata, Turin (IT); Luca Serazio, Turin (IT)

(73) Assignee: Telecom Italia S.p.A., Milan (IT)

( * ) Notice: Subject to any disclaimer, the term of this patent is extended or adjusted under 35 U.S.C. 154(b) by 673 days.

(21) Appl. No.: 10/506,755

(22) PCT Filed: Feb. 26, 2003

(86) PCT No.: PCT/EP03/01978

§ 371 (c)(1),
(2), (4) Date: Sep. 3, 2004

(87) PCT Pub. No.: WO03/077527

PCT Pub. Date: Sep. 18, 2003

(65) Prior Publication Data

US 2005/0114699 A1    May 26, 2005

(30) Foreign Application Priority Data

Mar. 8, 2002  (IT) .......................... TO2002A0201

(51) Int. Cl.
*H04L 9/00*   (2006.01)
(52) U.S. Cl. .................. 713/165; 713/164; 713/150
(58) Field of Classification Search ................ 713/165, 713/164, 150
See application file for complete search history.

(56) References Cited

U.S. PATENT DOCUMENTS 6,134,307 A    10/2000    Brouckman et al.

(Continued)

FOREIGN PATENT DOCUMENTS

WO      WO 99/09733        2/1999

(Continued)

OTHER PUBLICATIONS

Terminal-Controlled Mobility Management in Heterogeneous Wireless Networks Quoc-Thinh Nguyen-Vuong; Nazim Agoulmine; Yacine Ghamri-Doudane; Communications Magazine, IEEE vol. 45, Issue 4, Apr. 2007 pp. 122-129.*

(Continued)

*Primary Examiner*—David Y Jung
(74) *Attorney, Agent, or Firm*—Andrew Wilford

(57) ABSTRACT

The invention relates to the decoding of charging data records (CDR) generated in a mobile telephone network. These records consist of files to be decoded that can be described on the basis of a formal description of the ASN.1 type. On the basis of: i) a description of the type of record to be decoded corresponding to at least a first type (GSM) and at least a second type (GPRS) of records to be decoded, and on the basis of ii) said formal description of the type ASN.1 of the records to be decoded, an interpreter of the ASN.1 type (18) self-generates an updated version of decoder (10) of at least a first and at least a second type according to the type of record to be decoded. The files to be decoded are sent to the decoder created in this way, so as to output the decoded CDR records in text format.

5 Claims, 2 Drawing Sheets

U.S. PATENT DOCUMENTS

2001/0040947 A1    11/2001    Daase et al.

FOREIGN PATENT DOCUMENTS

WO     WO 00 59199     10/2000

OTHER PUBLICATIONS

Media-independent handover for seamless service provision in heterogeneous networks Lampropoulos, G.; Salkintzis, A.K.; Passas, N.; Communications Magazine, IEEE vol. 46, Issue 1, Jan. 2008 pp. 64-71.*

Enhancing wireless spectrum utilization with a cellular-ad hoc overlay architecture Sankaranarayanan, S.; Papadimitratos, P.; Mishra, A.; Military Communications Conference, 2005. MILCOM 2005. IEEE Oct. 17-20, 2005 pp. 405-412 vol. 1.*

* cited by examiner

METHOD AND SYSTEM FOR DECODING CHARGING DATA RECORDS IN MOBILE TELEPHONE NETWORKS

CROSS REFERENCE TO RELATED APPLICATIONS

This application is the US national phase of PCT application PCT/EP03/01978, filed 26 Feb. 2003, published 18 Sep. 2003 as WO 2003/077527, and claiming the priority of Italian patent application TO2002A000201 itself filed 8 Mar. 2002, whose entire disclosures are herewith incorporated by reference.

FIELD OF THE INVENTION

The present invention relates to the problem of decoding the so-called Charging Data Records (normally known by the acronym CDR) emitted by the nodes of a mobile telephone network.

BACKGROUND OF THE INVENTION

Such charging data records are currently decoded by employing solutions based on software applications, which, for example, decode GSM network records separately from those of an associated GPRS network. Specifically, the application is developed manually starting from the record coding specifications, and each time there is a modification/new release of the GSM and/or GPRS systems and when new functions are added, parts of the software must be to some extent rewritten.

There is consequently a need to provide solutions that can decode both GSM and GPRS format records, and for solutions that take into account the frequent updating of the record format after the introduction of new GSM and GPRS network services/performances, as well as the possibility of easy extension of the application to new functions such as UMTS.

SUMMARY OF THE INVENTION

The solution, according to this invention, basically envisages the automatic generation of the logic that decodes the records. Whereas known solutions include the rewriting of the record decoding software whenever variations are introduced by the MSC manufacturer (Mobile Switching Center) or SGSN/GGSN (Serving GPRS Support Node and Gateway GPRS Support Node), the solution according to the invention simply requires the manufacturer to provide a formal record description of the ASN.1 type (Abstract Syntax Notation One).

The solution, according to the invention, then uses this description to directly generate the code that decodes the data record. As a result, the decoder adaptation times can be cut from several weeks to a few days, making it easy to keep right up to date with the mobile network's frequent alterations.

The solution, according to the invention, includes the decoding of GSM records and GPRS records, which means that a single tool can be used on a mixed network employing both technologies. This is particularly advantageous if one considers that the operators of large-scale mobile telephone networks use both technologies in the network, in conditions in which the network update is carried out asynchronously.

The solution, according to the invention, proposes to decode the data records for GSM and GPRS functions, but its main features also make it easy and quick to extend the solution to other functions such as UMTS.

BRIEF DESCRIPTION OF DRAWINGS

The invention is hereafter described, by way of a non-limiting example only, with reference to the annexed drawings wherein.

DETAILED DESCRIPTION OF THE PREFERRED EMBODIMENTS

Figure 1:
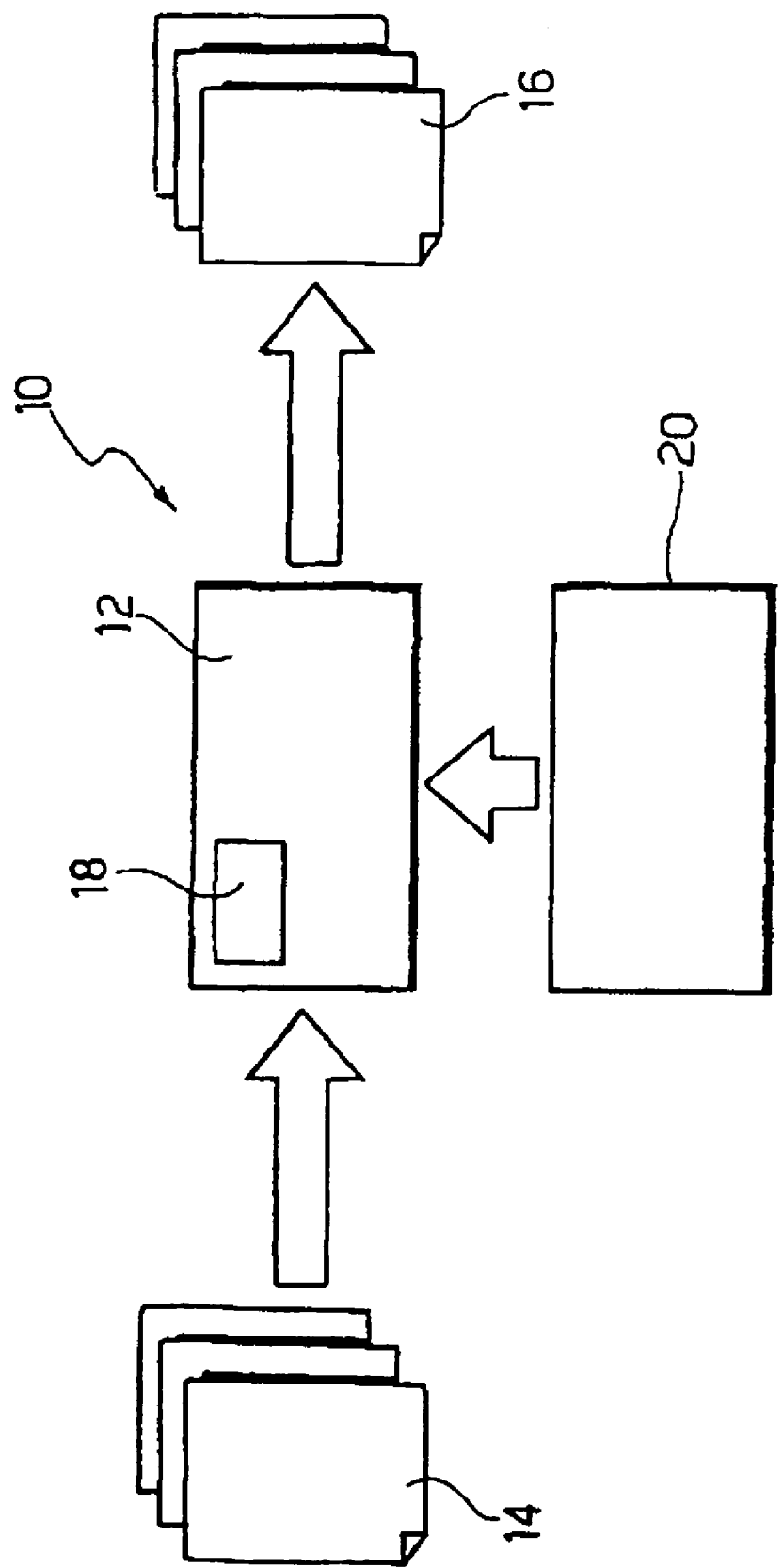
FIG. 1 is a functional block diagram illustrating the general architecture and the input/output/control relationships of a system that operates according to the invention.
Figure 2:
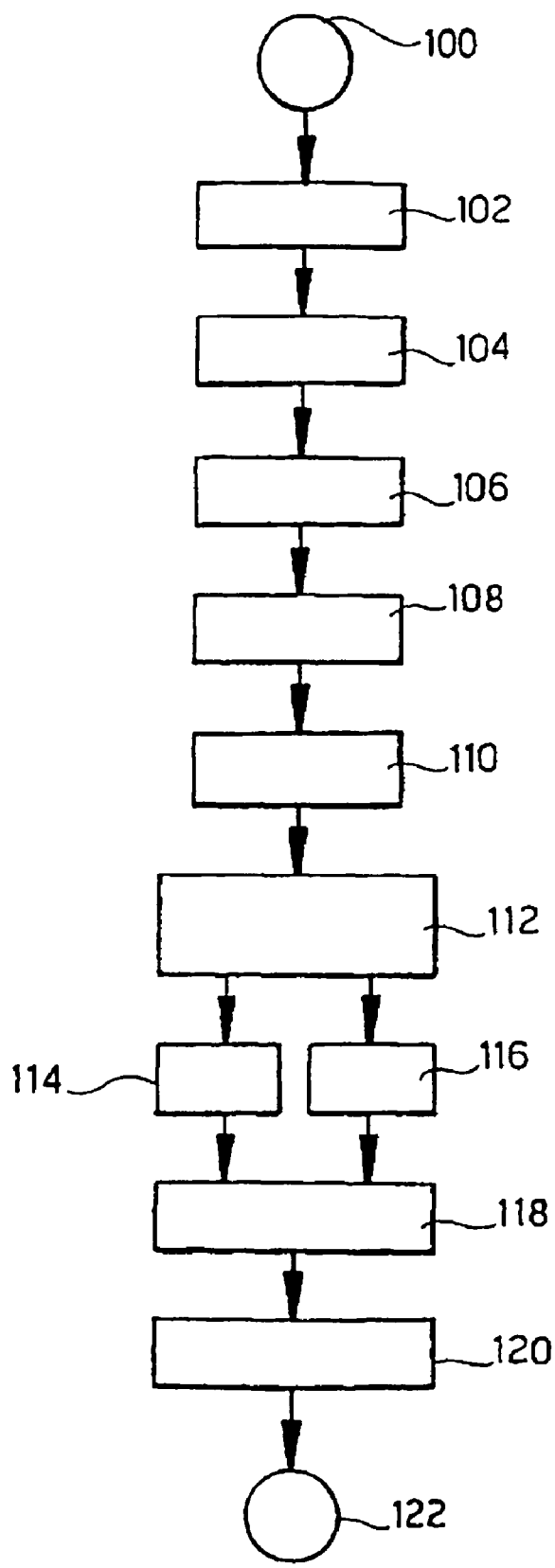
FIG. 2 is a flow diagram illustrating the main stages into which the method is divided according to the invention.

As shown in FIG. 1, the illustrated system, referred to with 10, has a main element, which is a processing core 12, destined to input a file 14 to be decoded, which then outputs a corresponding decoded file 16. The system 12 works on the basis of a decoding logic that is directly self-generated from the formal description ASN.1 contained in a file 20 received from the outside. As already known, the description of the records in ASN.1 (or equivalent, and consequently a description "of the ASN.1 type") constitutes a set of specifications that describe the coding format of the records in ASN.1 Notation or equivalent.

The input or log file 14 contains the records generated by the real network equipment (MSC for GSM records or SGSN/GGSN for GPRS records) in coded hexadecimal format.

The decoding operation is run on the basis of the set of user parameters that characterize the log file, the type of record (SGM/GPRS) and the output format.

In particular, starting from an initial step 100, the first steps in the operating sequence of the system 10 include the reading of the parameters sent to output, which are:

type of record to be decoded: GSM or GPRS (read by the system in step 102),
name of the log file to be decoded (step 104),
decoding format, i.e. the output format of the decoded file (read in step 106); this format may be "long", when the decoding, the length and the contents in hexadecimal are given for each record field, or "short", when only the decoding is given for each record field,
log file containing the records to be decoded (step 108), and
formal record description of the ASN.1 type (step 110).

Depending on the record description, an interpreter, such as an ASN.1 interpreter, included in the processing core 12 (see block 18 in FIG. 1) creates and runs a series of procedures (collectively referred to as 112), which in terms of a self-generation operation, create an updated version of the GSM decoder (step 114) or GPRS decoder (step 116) according to the type of record read in step 102.

The type of decoder selected (114 or 116) according to the parameter indicating the type of record (step 102) is further parameterized according to the parameters read in steps 104 and 106 (log file name and decoding format).

Once the decoder has been updated and programmed, it inputs (step 118) the file 14 containing the records to be decoded, and then outputs (step 120) the file containing the records decoded in text format. Reference 122 indicates the final step in the procedure.

Naturally, numerous changes can be made to the construction and embodiments of the invention envisaged and illustrated herein, without however departing from the scope of the present invention.

The invention claimed is:

1. Method of operating a mobile telephone network comprising a system for decoding charging data records generated in the mobile telephone network, the system comprising a processing core provided with an interpreter and receiving as input a first file of charging data records to be decoded and a second file containing a formal description of the ASN.1 type and generating a corresponding decoded file, the method including the steps of:

identifying the type of record to be decoded, the identification corresponding to at least a first type and at least a second type of records to be decoded, providing a decoder including an interpreter of the ASN.1 type, providing said formal description of the ASN.1 type of the records to be decoded, self-generating by means of said interpreter and in relation to the aforementioned description, an updated decoder version of at least a first or a second type according to the type of record to be decoded, and supplying said files to be decoded to the decoder self-generated in this way, so as to output said decoded records in text format.

2. The method defined in claim 1, characterized by the fact that said at least a first type of record and said at least a second type of record is selected from the group consisting of GSM, GPRS or UMTS records.

3. The method defined in claim 1, further comprising the steps of:

selecting one of the first and one of the second types of decoder, and parameterizing the decoder selected in relation to at least one parameter selected from the group made up of:

name of log file to be decoded and output format of the decoded file.

4. The method defined in claim 3 wherein the output format of the decoded file is selected from the following:

a long format in which the decoding, the length and the contents in hexadecimal are given for each record field, and a short format for which only the decoding is given for each record field.

5. A system for decoding charging data records generated in a mobile telephone network comprising a processing core provided with an interpreter, the processing core receiving as input a first file of charging data records to be decoded and a second file containing a formal description of the ASN.1 type for generating a corresponding decoded file, the processing core operating according to the method defined in claim 1.

* * * * *